United States Patent
Ohki et al.

(10) Patent No.: US 10,689,276 B2
(45) Date of Patent: *Jun. 23, 2020

(54) SYSTEM AND METHOD FOR WATER DISINFECTION

(71) Applicants: Akiyoshi Ohki, Shirasato (JP); Whitney Rich, Minato-ku (JP)

(72) Inventors: Akiyoshi Ohki, Shirasato (JP); Whitney Rich, Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/410,314

(22) Filed: May 13, 2019

(65) Prior Publication Data
US 2020/0055755 A1    Feb. 20, 2020

Related U.S. Application Data

(63) Continuation of application No. 16/104,575, filed on Aug. 17, 2018, now Pat. No. 10,287,194.

(51) Int. Cl.
*C02F 1/78* (2006.01)
*C02F 1/00* (2006.01)
(Continued)

(52) U.S. Cl.
CPC .............. *C02F 1/78* (2013.01); *B01F 3/0446* (2013.01); *B01F 5/12* (2013.01); *B01F 13/1027* (2013.01);
(Continued)

(58) Field of Classification Search
CPC ............ B01F 13/1027; B01F 15/00136; B01F 15/0022; B01F 15/00344;
(Continued)

(56) References Cited

U.S. PATENT DOCUMENTS

| | | | |
|---|---|---|---|
| 7,105,092 B2 * | 9/2006 | Chiba | C02F 3/12 210/220 |
| 10,287,194 B1 * | 5/2019 | Ohki | C02F 1/78 |

(Continued)

OTHER PUBLICATIONS

Abstract of CN-1186179-A, Li Tinghao (Year: 1998).*
(Continued)

*Primary Examiner* — Terry K Cecil
(74) *Attorney, Agent, or Firm* — Patrick J. S. Inouye; Leonid Kisselev

(57) ABSTRACT

The efficiency of water disinfection can be significantly increased by supplying the ozone in combination with oxygen to an inlet of a cavitation pump. The ozone and the oxygen are turned into ultra-fine bubbles via cavitation action within the pump, facilitating the dissolution of the oxygen and ozone within the water. The water mixed with the oxygen and the ozone is subsequently supplied to a line atomizer, where the dissolution of the ozone within the mixture is completed. The combined use of the cavitation pump and the line atomizer can lead to a substantially complete dissolution of the supplied ozone within water that needs to be disinfected, allowing to easily achieve the concentration of ozone necessary for water disinfection. Due to this efficiency, the system and method described are highly scalable and suitable for water purification at water purification plants of various sizes.

16 Claims, 2 Drawing Sheets

(51) Int. Cl.
  *B01F 3/04* (2006.01)
  *B01F 5/12* (2006.01)
  *B01F 13/10* (2006.01)
  *B01F 15/00* (2006.01)
  *C02F 1/72* (2006.01)

(52) U.S. Cl.
  CPC .... *B01F 15/0022* (2013.01); *B01F 15/00136* (2013.01); *B01F 15/00344* (2013.01); *C02F 1/008* (2013.01); *C02F 1/727* (2013.01); *B01F 2003/04879* (2013.01); *B01F 2003/04886* (2013.01); *B01F 2215/0052* (2013.01); *C02F 2209/006* (2013.01); *C02F 2209/36* (2013.01); *C02F 2209/38* (2013.01); *C02F 2209/40* (2013.01); *C02F 2303/04* (2013.01); *C02F 2303/26* (2013.01)

(58) Field of Classification Search
  CPC .. B01F 2003/04879; B01F 2003/04886; B01F 2215/0052; B01F 3/0446; B01F 5/12; C02F 1/008; C02F 1/727; C02F 1/78; C02F 2103/002; C02F 2209/00; C02F 2209/006; C02F 2209/36; C02F 2209/38; C02F 2209/40; C02F 2303/04; C02F 2303/26
  See application file for complete search history.

(56) References Cited

U.S. PATENT DOCUMENTS

| 2002/0053537 | A1* | 5/2002 | Lucido | C02F 3/006 210/94 |
| 2005/0258094 | A1 | 11/2005 | Chiba | |
| 2010/0276820 | A1* | 11/2010 | Mogami | B01F 5/0604 261/74 |
| 2015/0068983 | A1 | 3/2015 | Pawlow | |
| 2015/0175461 | A1* | 6/2015 | Leonard | C02F 1/001 210/668 |
| 2015/0328603 | A1* | 11/2015 | Smith | B01F 7/00816 366/118 |
| 2016/0221848 | A1 | 8/2016 | Miller et al. | |

OTHER PUBLICATIONS

OHR Mixer<http://www.ohr-labo.com/en/mixer.html>(Web page cached on Aug. 16, 2018).

Takafumi Kawamura, "Shadowgraph Analysis of Atomizer Microbubbling Effect" Tokyo University Graduate School of Engineering Faculty of Environmental and Marine Technology (Feb. 2005).

* cited by examiner

SYSTEM AND METHOD FOR WATER DISINFECTION

CROSS-REFERENCE TO RELATED APPLICATION

This patent application is a continuation of U.S. Pat. No. 10,287,194, issued May 15, 2019, the disclosure of which is incorporated by reference.

FIELD

The present invention relates in general to water purification, and in particular, to a system and method for gas-based water disinfection.

BACKGROUND

Access to safe drinking water has been described by the World Health Organization as a basic human right that is essential to health. While there are many sources from which fresh water could be obtained, such as groundwater, upland lakes and reservoirs, and rivers, such water may not be suitable for drinking due to presence of various microorganisms in the water. The microorganism contamination can pose immediate health risks, such as when the water is contaminated with pathogenic strains of *E. Coli* bacteria, cholera causing *Vibrio cholera*, viruses, and protozoan parasites, such as *Giardia lamblia*. Making the water suitable for drinking requires disinfection, preferably to the point of sterilization. As the size of the population requiring the drinking water, and consequently the volume of drinking water needed, grows, the challenge of purifying the water to a sufficient extent to make the water suitable for drinking similarly becomes larger.

Several techniques are currently in use for disinfection of water, but these techniques have significant drawbacks. For example, addition of chemicals, such as chlorine-containing compounds, have only limited effectiveness against pathogenic protozoa such as *Giardia lamblia*. Likewise, while disinfecting water with ultraviolet light is effective in low turbidity water, the effectiveness decreases as the turbidity increases.

Disinfection using ozone, which can act as a strong oxidizing agent that is toxic to most water-borne microorganisms, provides an effective alternative to chemical-based and ultraviolet-light based water sterilization. Ozone is created by passing oxygen through an ultraviolet light or a cold electrical discharge and is added to the water by bubble contact.

A concentration of 1-3 ppm within the water being purified is generally required for the ozone to be an effective disinfecting agent, with a higher concentration being potentially damaging to the pipes carrying the ozonated water. Introducing ozone into the water in that concentration may be a challenge that requires significant resources and that current techniques are not efficient at handling, especially in industrial settings, such as when the ozonation has to be performed at a water treatment plan responsible for providing drinking water to a large city. For example, a bubble diffuser is a device for dissolving ozone into water in which a porous object is used to break ozone gas into small bubbles at the bottom of a water basin with the bubbles slowly rising to the top of the basin and partially dissolving in the water. However, the efficiency with which a bubble diffuser dissolves ozone tends not to exceed 75%, with the at least 25% inefficiency making the purification unnecessarily expensive and wasteful, especially as higher volumes of water are processed. While the efficiency may be improved by increasing the depth of the water basin, such an increase may not be commercially viable nor technically practicable in a industrial application.

Accordingly, there is a need for a way to perform efficient water purification using ozone that is also scalable for industrial-scale water disinfection.

SUMMARY

The efficiency of water disinfection can be significantly increased by supplying the ozone in combination with oxygen to an inlet of a cavitation pump, The ozone and the oxygen are turned into ultra-fine bubbles via cavitation action within the pump, facilitating the dissolution of the oxygen and ozone within the water. The water mixed with the oxygen and the ozone is subsequently supplied to a line atomizer, where the dissolution of the ozone within the mixture is completed. The combined use of the cavitation pump and the line atomizer can lead to a substantially complete dissolution of the supplied ozone within water that needs to be disinfected, allowing to easily achieve the concentration of ozone necessary for water disinfection. Due to this efficiency, the system and method described are highly scalable and suitable for water purification at water purification plants of various sizes.

In one embodiment, a system and method for liquid disinfection is provided. Through one or more pipes a liquid contaminated by microorganisms is pumped to a cavitation device. Using a gas generator a gas mixture is generated, the gas mixture including a plurality of gases. The gas mixture is pumped into one or more of the pipes, wherein the gas mixture mixes with the liquid within one or more of the pipes. The cavitation device dissolves a portion of the gas mixture within the liquid via cavitation and the liquid and the remaining undissolved gas mixture are pumped into a line atomizer. A further portion of the gas mixture is dissolved by the line atomizer into the liquid, wherein the dissolved gases reduce a concentration of microorganisms within the liquid.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
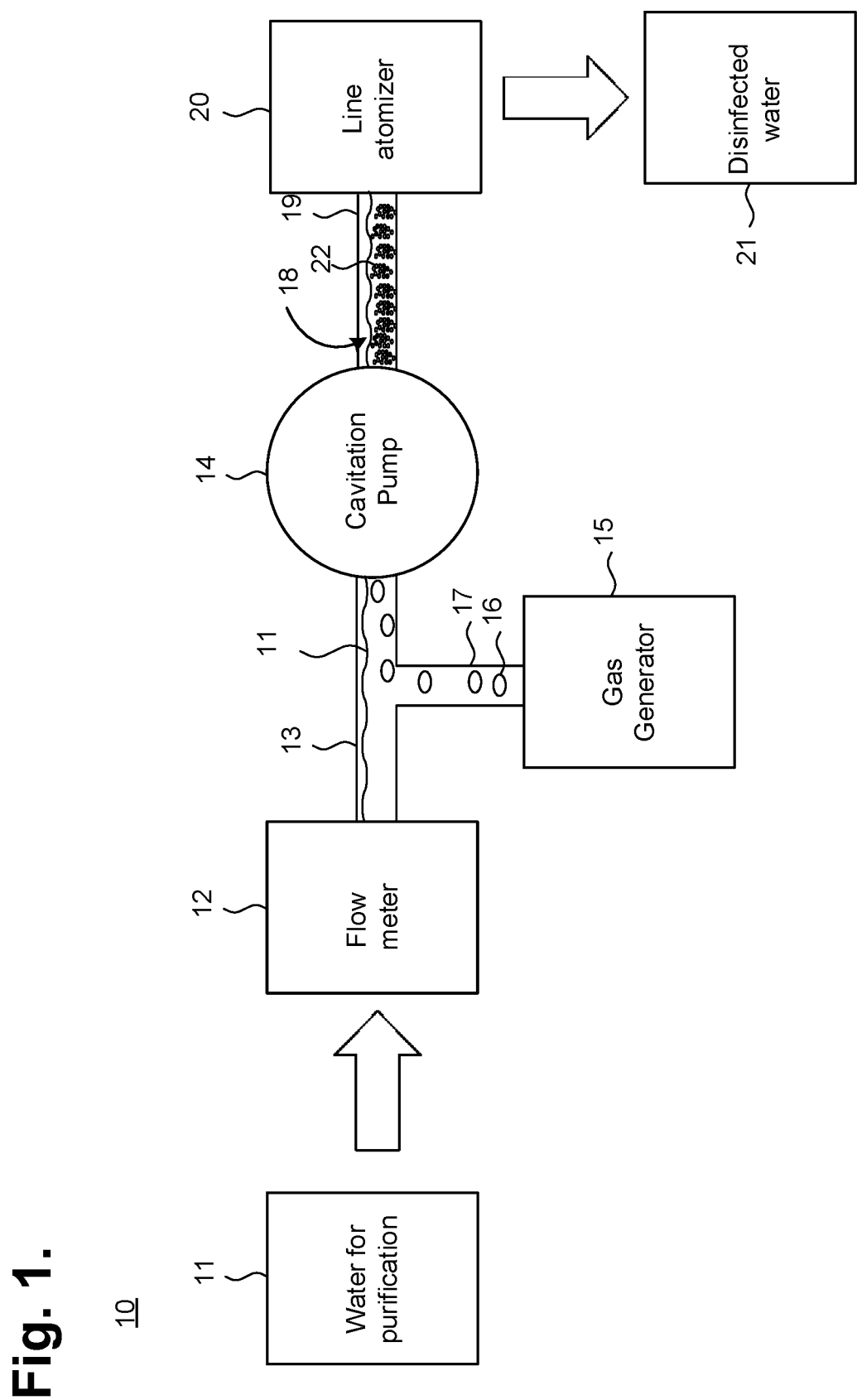
FIG. 1 is a block diagram showing a system for gas-based water sterilization in accordance with one embodiment.

By introducing a gaseous mixture that includes ozone and oxygen to an inlet of a cavitation pump that is interfaced to a line atomizer, the efficiency of dissolution of the ozone and the oxygen within water, and consequently the degree of water disinfection can be significantly increased. FIG. 1 is a block diagram showing a system 10 for gas-based water sterilization in accordance with one embodiment. The system 10 can be implemented in a water purification plant, though other kinds of implementations are possible.

The system 10 includes a flow meter 12 through which water 11 that needs to be purified flows. The flow meter 12 measures the rate at which the water 11 flows, though other kinds of measurements by the flow meter 12. In one embodiment, the water 11 in need of purification can be greywater, water that has been generated in households or office buildings from streams without fecal contamination, such as from sinks, showers, baths, washing machines and dish washing machines. In a further embodiment, the water 11 may come from other sources. The water may be stored on the same site as the flow meter 12, or delivered from another location, and be supplied to the flow meter 12 via one or more pipes (not shown). Regardless of the source, the water 11 needs to be substantially free of solid sediments prior to passing through the flow meter 12.

The flow meter 12 is also connected via one or more pipes 13 to a cavitation pump 14, with water 11 that has been analyzed by the flow meter 12 flowing through the pipes 13 to the cavitation pump 14. Also connected to the one or more pipes 13 is a gas generator 15. The gas generator generates a gas mixture 16 of oxygen and ozone, such by passing oxygen through an ultraviolet light, though other ways to generate the mixture 16 are possible. In one embodiment, the mixture is composed of about 80% oxygen and about 20% of ozone, though other ratios of oxygen and ozone in the mixture 16 are possible. The gas mixture 16 is pumped through one or more gas supply pipes 17 to one or more of the pipes 13, mixing with the water 11 prior to the water reaching the cavitation pump 14. The amount of the gas mixture pumped by the gas generator 15 can depend on the flow rate of the water 15 measured by the flow meter 12. In one embodiment, the flow rate can vary from 120 m$^3$ of water 11 per hour to 2,000 m$^3$ of water 11 per hour, and the rate (and consequently the amount) of the gas mixture 16 would increase proportionally with the increase in flow rate (and thus the amount of water 11 being treated). As further described below, the amount of the gas mixture can further be increased if the quality of the purification of the water 11 proves to be below a desired level. The settings of the gas generator 15 regulating the rate at which the gas mixture 16 is pumped via the gas supply pumps 17 can be changed either manually, such as by personnel of a water purification plant, or under computerized control that allows automatic (or under remote user control) changing of the settings of the gas generator 15. In one embodiment, the volume of the gas mixture 16 that enters the cavitation pump 14 does not exceed 15% of the total volume of the water 11 and the mixture 16 within the cavitation pump. In a further embodiment, another ratio of the volume of the water 11 to the volume of the gas mixture 16 could be used. While providing the ozone as part of the mixture 16 is essential for the sterilization of the water, the presence of dissolved oxygen in the water 11 further prevents growth of anaerobic pathogenic microorganisms.

Cavitation is the formation of vapor cavities in a liquid. In pumps, cavitation is caused by an impeller of the pump moving through a liquid, with low-pressure areas being formed as the liquid accelerates and moves past the blades, causing the liquid to vaporize and form small bubbles of gas. While cavitation in most cases is undesirable as damaging to the components of the pump, the cavitation pump 14, while subject to the increased wear due to cavitation, takes advantage of the cavitation effect to help dissolve the gaseous mixture within the 16 within the water 11. In particular, the rotation of the impeller of the cavitation pump 14 is fast enough to slice the formed bubbles into multiple smaller bubbles, thus forming ultra-fine bubbles 22 (of a diameter from 1 nm-30,000 nm). Upon the formation of the bubbles, a portion of the ozone and a portion of oxygen in the gaseous mixture rapidly dissolve within the water 11 causing the destruction of the microorganisms or other molecules present in the water 11.

The cavitation pump 14 operates under a high pressure, which facilitates the dissolution of the ozone (and the oxygen) within the water 11. In one embodiment, the pressure inside the pump 14 is between 0.0981 MPa and 5.394 MPa, though other values of pressure are also possible.

The vapor-liquid mixture 18 of water 11 (with dissolved ozone and partially dissolved oxygen), gaseous ozone and oxygen, and the ultra-fine bubbles 22 within the water 11 is pumped by the cavitation pump 14 via one or more pipes 19 to a line atomizer 20 that completes the dissolution of the ozone within the water 11 by churning and mixing the vapor-liquid mixture 18 under high pressure (approximately 0.0981-5.394 MPa (1-55 kg/cm$^2$), with the dissolution of the ozone and the oxygen being accelerated due to the tornado effect within the line atomizer 2-. In one embodiment, the line atomizer 20 can be the OHRMixer sold by OHR Laboratory Corporation of 536-1, Noda, Irumashi, Saitama 358-0054 Japan. In a further embodiment, other line atomizers 20 can be used. In one embodiment, about 40% of the ozone pumped by the cavitation pump 14 into the water 11 is dissolved at the cavitation pump 14, with the remaining amount of ozone (about 60%) being dissolved in the water 11 in the line atomizer 20. Other amounts of ozone dissolved within the cavitation pump 14 and the line atomizer 20 are possible. While complete dissolution of the provided ozone within the water 11 is possible following the processing by the line atomizer 20, in one embodiment, about 70%-80% of the oxygen dissolves within the water 11. In a further embodiment, other percentage of oxygen dissolution is possible.

The combination of the cavitation pump 14 and the line atomizer 20 allow for substantially complete dissolution of the ozone within the water 11, allowing to achieve the desired concentration of ozone (1-3 ppm) with minimal amount of ozone expended. Thus, despite the inefficiencies caused by the cavitation in the cavitation pump, overall, introducing the gas mixture 16 at the inlet of the cavitation pump 14, with the subsequent processing by the line atomizer 20, increases the overall efficiency of the ozone dissolution and decreases the amount of resources necessary to disinfect the water 11 to a desired degree, including to a degree of sterilization. The efficiency is greater than in alternative solutions involving line atomizers, such as when two line atomizers are connected in a series without the use of a cavitation pump. Further, due to the high efficiency, the system 10 is easily scalable and can be adapted to process at water purification plans of different sizes.

The water 21 that is discharged from the line atomizer 20 can be analyzed to make sure that the sterilization effect of ozone is adequate. Such processing can include testing of the concentration of microorganisms within the water 21 (such as determining optical density of the microorganism) and determining other kinds of microorganisms within the ozonated water 21. Other kinds of tests are possible. In one embodiment, the testing can be done three times a day, though in a further embodiment, other kinds of schedule for the testing is possible. In one embodiment, the testing can be done by humans; in a further embodiment, the testing can be automated, such as using sensors positioned to analyze the disinfected water 21. Based on the analysis, the settings of the gas generator 15 can be changed to increase the rate at which the gas mixture 16 is pumped from the gas generator 16 (and thus increasing the concentration of the ozone in the water 11).

The components of the system 10 can be operated manually or under a control of a computer. Thus, a computer (not shown) can be interfaced (wirelessly or through wired connections) to the gas generator 15, the flow meter 12, any other sensors in the system 10, and control the amount of the gas mixture 16 pumped by the gas generator based on the flow rate of the water 11 or the determined characteristics of the disinfected water 21, either automatically or under local or remote user control.

Figure 2:
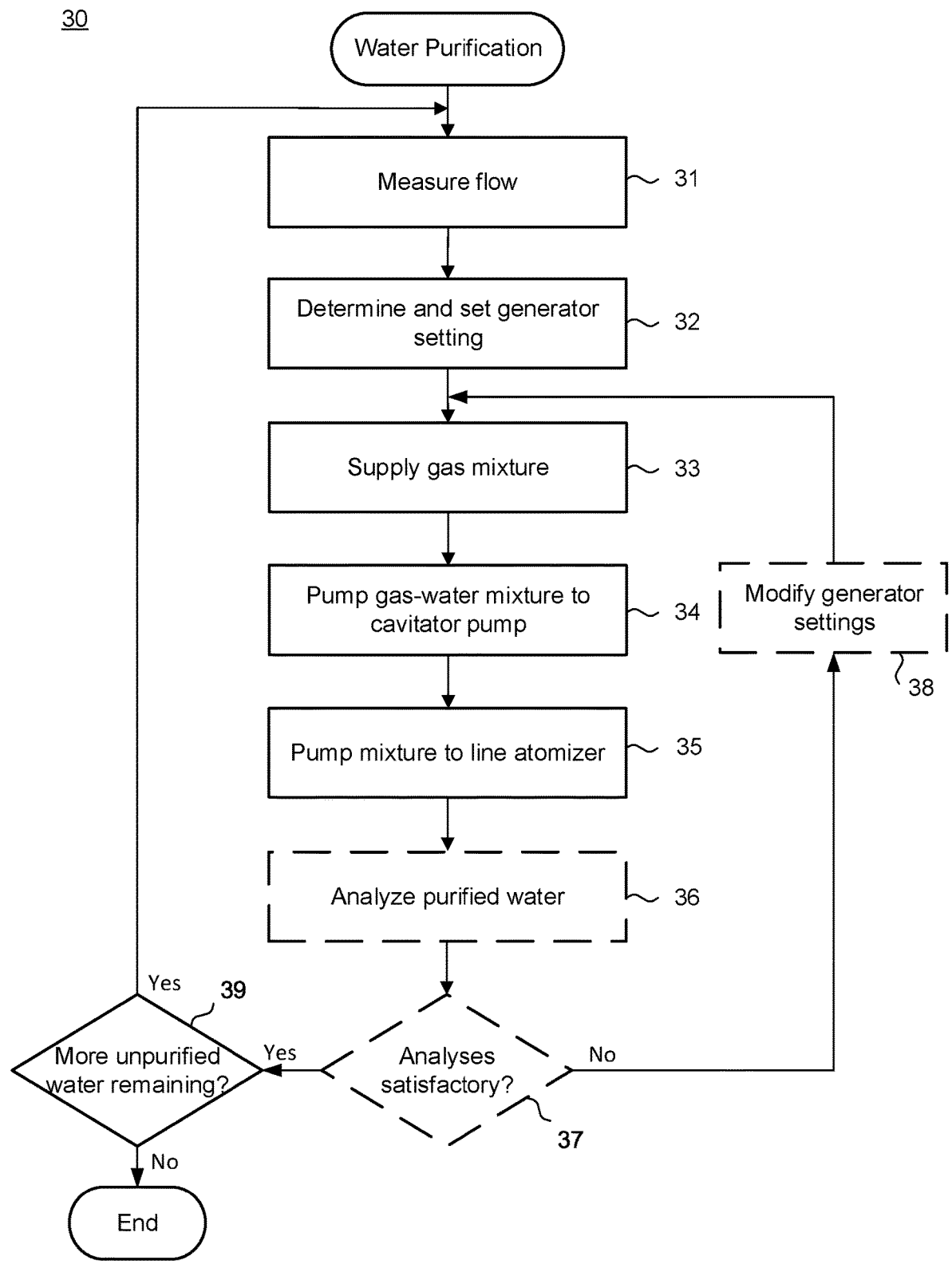
FIG. 2 is a flow diagram showing a method for gas-based water disinfection in accordance with one embodiment.

FIG. 2 is a flow diagram showing a method 30 for gas-based water disinfection in accordance with one embodiment. Flow of water 11 in pipes leading to the cavitation pump 14 is measured using a flow meter 12 (step 31). The settings of the gas generator 15, such as the rate at which the gas generator pumps the gaseous mixture 16 is pumps via the pipes 17, is determined based on the measured flow rate, and the generator 15 is set to run at the determined settings (step 32). The gas generator 15 supplies the gas mixture through the one or more pipes 17 into the one or more pipes 13, where the gas mixture 16 mixes with the water 11 (step 33) and from where the gas mixture 16 and the water 11 are pumped into the cavitation pump 14 (where the gas mixture is partially dissolved within the water via cavitation created by the operation of the pump 14) (step 34). The cavitation pump 14 further pumps the vapor-liquid mixture 18 of water 11 (with partially dissolved ozone and oxygen), gaseous ozone and oxygen, and ultra-fine bubbles 22 created via the cavitation to the line atomizer 20, where the ozone and the oxygen are further dissolved within the water 11, causing the disinfection of the water (step 35). Optionally, the disinfected water 21 extruded from the line atomizer 20 is analyzed, such by testing the density and kinds of microorganisms present within the disinfected water 21, though other kinds of analysis are possible (step 36). If the results of the analysis are satisfactory (such as with the density of the microorganisms being below a predefined threshold or absence of certain pathogenic microorganisms) (step 37), the method moves to step 39. If the results are not satisfactory (step 37), the settings of the gas generator 15 are modified, such as by increasing the rate at which the gas mixture 16 is supplied via the one or more supply pipes (step 38), with the method 30 returning to step 33.

If more unpurified water 11 remains (step 39), the method 30 returns to step 31. If no more unpurified water remains to be processed (step 39), the method 30 ends.

While the description above refers to disinfection of water, in a further embodiment, the system 10 and method 30 described above could be used for disinfection of another liquid.

While the invention has been particularly shown and described as referenced to the embodiments thereof, those skilled in the art will understand that the foregoing and other changes in form and detail may be made therein without departing from the spirit and scope of the invention.

What is claimed is:

1. A system for liquid disinfection, comprising:
one or more pipes through which a liquid contaminated by microorganisms is supplied to a cavitation pump;
a gas generator configured to generate a gas mixture comprising a plurality of gases and to pump the gas mixture into one or more of the pipes, wherein the gas mixture mixes with the liquid within one or more of the pipes;
a cavitation pump configured to provide cavitation by an impeller of the pump under a pressure of substantially 0.0981 MPa-5.394 MPa and to cause a formation in the liquid of ultra-fine bubbles via the impeller slicing larger bubbles into the ultra-fine bubbles, to dissolve a portion of the gas mixture within the liquid via the cavitation, and to pump the liquid, the ultra-fine bubbles within the liquid, and the remaining undissolved gas mixture into a line atomizer; and
the line atomizer configured to dissolve a further portion of the gas mixture into the liquid by churning and mixing the liquid, the ultra-fine bubbles, and the gas mixture under the pressure of substantially 0.0981 MPa-5.394 MPa, wherein the dissolved gases reduce a concentration of microorganisms within the liquid.

2. The system according to claim 1, wherein the liquid comprises greywater.

3. The system according to claim 2, wherein the gas generator generates the gas mixture by passing one of the gases through ultraviolet light.

4. The system according to claim 1, further comprising:
one or more sensors positioned to analyze the liquid following the dissolution of the further portion of the gas mixture by the line atomizer.

5. The system according to claim 4, wherein the analysis comprises determining one or more of an optical density of the microorganisms within the liquid and determining kinds of the microorganisms within the liquid.

6. The system according to claim 4, further comprising:
a flow meter configured to measure a flow rate of the liquid through one or more of the pipes.

7. The system according to claim 6, further comprising:
a computer interfaced to the gas generator, the flow meter, and the one or more sensors, and configured to control an amount of the gas mixture pumped by the gas generator into the one or more pipes based on one or more of the flow rate and the analysis by the sensors.

8. The system according to claim 7, wherein the computer is configured to control the amount of the gas mixture at least one of automatically and under a control of a user.

9. A method for liquid disinfection, comprising:
pumping through one or more pipes a liquid contaminated by microorganisms to a cavitation pump;
generating using a gas generator a gas mixture comprising a plurality of gases and pumping the gas mixture into one or more of the pipes, wherein the gas mixture mixes with the liquid within one or more of the pipes;
dissolving under a pressure of substantially 0.0981 MPa-5.394 MPa by the cavitation pump a portion of the gas mixture within the liquid via cavitation produced by an impeller of the pump, causing a formation of ultra-fine bubbles in the liquid via the impeller slicing larger bubbles into the ultra-fine bubbles, and pumping the liquid, the ultra-fine bubbles within the liquid, and the remaining undissolved gas mixture into a line atomizer;
dissolving by the line atomizer a further portion of the gas mixture into the liquid by churning and mixing the liquid, the ultra-fine bubbles, and the gas mixture under a the pressure of substantially 0.0981 MPa-5.394 MPa, wherein the dissolved gases reduce a concentration of microorganisms within the liquid.

10. The method according to claim 9, wherein the liquid comprises greywater.

11. The method according to claim 10, further comprising:
generating by the gas generator the gas mixture by passing one of the gases through ultraviolet light.

12. The method according to claim 9, further comprising:
analyzing using one or more sensors the liquid following the dissolution of the further portion of the gas mixture by the line atomizer.

13. The method according to claim 12, wherein the analysis comprises determining one or more of an optical density of the microorganisms within the liquid and determining kinds of the microorganisms within the liquid.

14. The method according to claim 12, further comprising:
measuring by a flow meter a flow rate of the liquid through one or more of the pipes.

15. The method according to claim 14, further comprising:
interfacing a computer to the gas generator, the flow meter, and the one or more sensors, and controlling an amount of the gas mixture pumped by the gas generator into the one or more pipes based on one or more of the flow rate and the analysis by the sensors.

16. The method according to claim 15, wherein the computer is configured to control the amount of the gas mixture at least one of automatically and under a control of a user.

* * * * *